Patented July 26, 1938

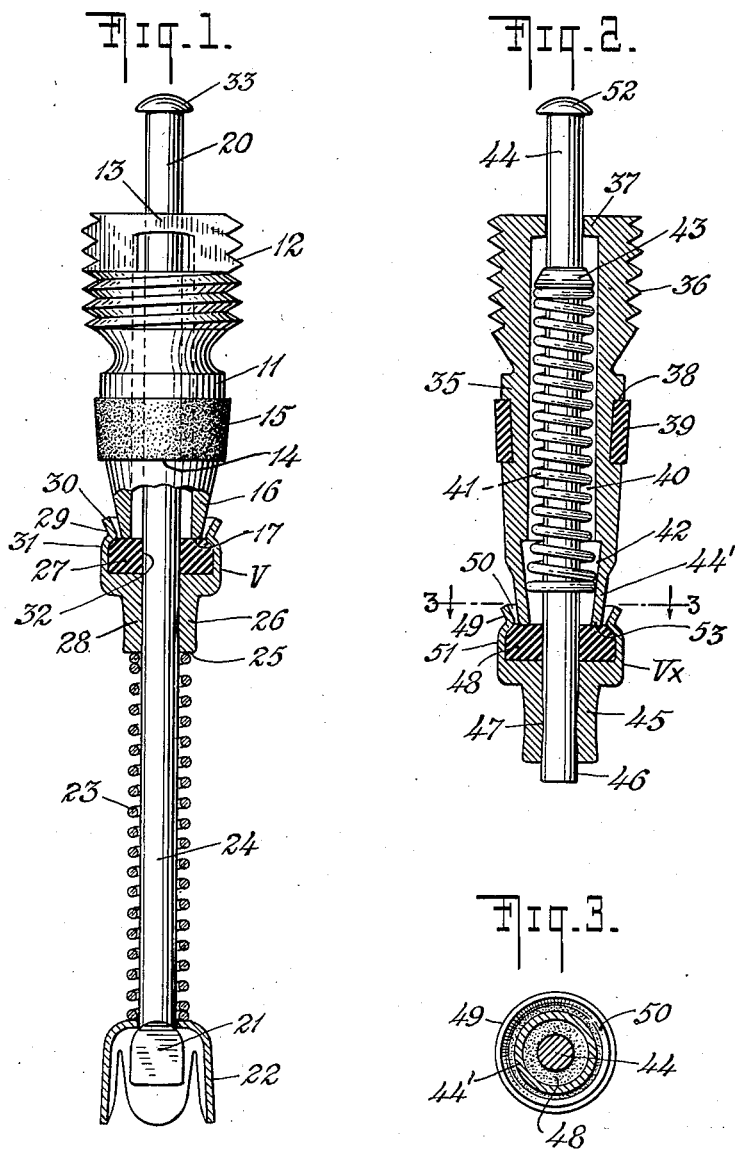

2,124,844

UNITED STATES PATENT OFFICE 2,124,844

VALVE CORE

Frank S. Boroughs, Elmhurst, Long Island, N. Y., assignor to G. M. Co. Manufacturing Co., Inc., Long Island City, N. Y., a corporation of New York Application January 28, 1937, Serial No. 122,713

1 Claim. (Cl. 251—144)

This invention relates to a core or "insides" for a tire-valve, especially to the type of tire-valve core which is formed as a unitary structure adapted for sale as a complete article of manufacture and for manipulation as a separate entity in the course of installation, removal and repair.

The invention relates more particularly to that class of tire-valve core which includes several makes that are characterized by the common provision of a valve-pin having non-separably mounted thereon a valve, a valve-seat member, and a screw plug by which the unit may be easily assembled with a valve casing by screwing the unit into a threaded mouth of the casing, from which the unit may be readily unscrewed and removed.

Such valve pins are usually fabricated in a machine having a chuck, the gripping members of which tend to mar the cylindrical periphery of the pin to such an extent that the striations and rugosities left thereon impair seriously the efficiency of the pin, interfering with its easy movement relatively to contiguous surfaces.

In such valve cores, one of the complemental valve elements usually includes an elastic gasket or valve seat element of annular form, supported in a cup-like holding member which is transfixed by the valve pin, and in many instances this gasket becomes partly displaced or otherwise ineffective in the course of the contacts between it and the valve pin, and between it and the complemental valve element.

Under such conditions, the general object of the present invention is to provide a valve pin which is so fabricated by a novel method of spinning the wire stock utilized, that the pin has an even, smooth, cylindrical periphery at all regions where it is contiguous with the circumjacent valve parts, as for example where the pin traverses a bearing therefor which may be advantageously provided near the mouth of the valve stem into which the core is screwed.

Above this region the free outer end of the pin is exposed when the valve cap is removed, and it is desirable to have a smooth-working bearing at this point, to avoid bending of the pin by rough usage if it does not work freely, and to avoid a binding of the pin in its movement in such bearing.

Another object of the invention is to provide for holding the elastic gasket above mentioned in an unusually solid manner, so that there can be no escape of air at the inner or outer boundaries of this ring-shaped member, either where it surrounds the pin, or where it is confined by the circumjacent cup-like support usually provided.

Other objects and features of the present invention will appear as the particular physical embodiment selected for illustration and description progresses.

In the accompanying drawing, like characters of reference are applied to corresponding parts throughout the several views which make up the drawing, in which Fig. 1 is a view in longitudinal sectional elevation of a tire valve core in the construction of which the present invention has been embodied;

Fig. 2 is a similar view of a modification in the construction of which the invention has been embodied to form a shorter core;

Fig. 3 is a fragmentary detail view in horizontal section on the line 3—3 of Fig. 2.

In a now-preferred form of the invention selected for illustration and description, referring first to Fig. 1, the part designated by the reference character 11 is the body of a tire valve core, threaded exteriorly, as at 12, to permit ready assembly of the core with a threaded mouth in a valve stem (not shown), in known manner, the body having a transverse ridge 13 of conventional type to facilitate manipulation of the valve core when turning the body for insertion and removal.

The body 11 is grooved at 14 to receive an elastic collar 15 adapted to be engaged with a suitable inner wall of the surrounding valve stem structure (not shown). Below the ring 15 the body tapers to form the annular nozzle 16, constituting at its free end 17 a seat for the valve proper which is designated generally by the reference character V.

The parts above designated by the reference characters 11 to 17 inclusive may be of a one-piece or two-piece metal structure, and correspond in general contour and function with known tire valve insides of similar disposition, as also does the valve V, and the valve pin 20, which transfixes the body 11 and valve V from end to end in known fashion, and projects therefrom at both ends.

The lower end, as at 21, is provided with an enlargement or stop, designed to hold in place a cup-shaped abutment 22 against which bears one end of a spring 23 which is coiled around the shank 24 of the valve pin, under compression between the abutment 22 and the lower shoulder 25 of a boss 26 fixed to the valve pin.

The successful operation of a tire valve of the above described type is dependent in great degree upon the perfection of the air-tight seal at the seat 17, when the valve is closed, as in Fig. 1, and such tightness, together with its permanence for a period which will provide for long life of the valve, depends upon the exactness and facility with which the body structure rides upon the pin and thus returns to closed position. Thus, if the pin is not smooth, it will cause a binding in its bearing and interfere with the proper operation of the valve.

One factor upon which such proper operation is dependent is that the solid support of the elastic gasket 27 be in such disposition relatively to the valve cup V, that there will be no shake at this region, at any time during the life of the valve core, but, on the contrary, that the elastic gasket 27 shall be held firmly at all times in position for well-seated engagement by the nozzle end 17.

This provision is accomplished by spinning in against the elastic gasket 27 a construction 29 near the mouth of the cup-like hollow boss 31 in which the elastic gasket 27 is supported, leaving a flaring lip 30 which aids in effecting accurate registry between the mutually contiguous parts of the nozzle 17 and upper face of the gasket 27.

In pursuance of one object of the invention, the valve pin 20 is fabricated throughout by a novel method of spinning the wire stock, which provides for the formation on the pin with a smooth periphery at all regions where it is contiguous with the circumjacent parts, and more particularly at the region where it passes through its bearing, and, in some measure, through the bore 28 and through the central orifice 32 of the elastic gasket 27.

This even, smooth, peripheral bearing surface is in contradistinction to the rugosities of corresponding regions upon pins fabricated in a machine in which a chuck is employed to grip the shank of the pin while the head, as 33, is being formed, such known pins having their shanks marred by the chuck-grips, which form in the shanks striations or scratches that interfere seriously with smooth sliding action as between the pin and the contiguous bearing surface of the transverse ridge 13.

I have discovered also that such striations cause binding of the pin in its bearing, thus interfering with the integrity of the seal; while the rugous character of the pin's bearing surfaces not only tends to wear out the mutually contiguous surfaces in an unduly short time, but also has a marked tendency to disturb the set position of the elastic gasket 27, and consequently the air-tight character of the seal.

In the embodiment of the invention shown in Figs. 2 and 3, the part designated by the reference character 35 is the body of a tire valve core, threaded exteriorly, as at 36, to permit ready assembly of the core with a threaded mouth in a valve stem (not shown), in known manner, the body having a transverse ridge 37 of conventional type to facilitate manipulation of the tire valve core when turning the body for insertion and removal.

The body 35 is grooved, at 38, to receive an elastic collar 39 adapted to be engaged with a suitable inner wall of the surrounding valve stem structure (not shown). Below the elastic collar 39 the body is extended to a distance sufficient to permit the formation therein of a bore 40 of adequate dimensions to enclose a spring 41 which is compressed under tension between the tapered periphery 42 (against which the enlarged end convolutions of the spring abut) at the lower end of the bore and an enlargement 43 formed near the upper end of a pin 44. The pin, having a head 52 at its upper extremity, traverses the body 35 longitudinally, within the bore 40, the spring 41 surrounding the pin and tending normally to bias the pin outward co-axially, i. e., in an upward direction when viewed as in Fig. 2.

The purpose of this movement is to cause normally the seating of a valve Vx, as shown in Fig. 2, against the end 53 of a valve element constituted by a tapering nozzle 44' formed at the free forward end of the body 35.

The valve Vx comprises a hollow boss 45 which is secured to the end 46 of the shank of the valve pin 44 in any suitable manner, as for example by swedging, hammering, or otherwise frictionally held to the pin, as at 47, in order to constitute the body 35, spring 41, valve pin 44 and valve Vx, a unitary structure with non-separable components, adapted to be sold as a complete, self-contained tire valve core, which can be readily assembled as an entity with the screw-threaded mouth of a tire valve stem, by screwing it therein, and which can be easily unscrewed therefrom, with the use of a split-end valve cap in conventional manner.

In pursuance of the invention, the valve pin 44 is fabricated by spinning wire stock to form a pin shank of smooth, even cylindrical periphery, free from the striations and rugosities which characterize such pins when fabricated in a machine provided with a chuck, the grips of which mar the circumference of the pin in such a manner as to deform it from a true cylinder.

At the upper end of the body, where the pin 44 extends through the upright ledge or wall 37, the smooth surfaced pin can have a better slip fit, and so will be better guided by the ledge while being forced inwardly at times; it being well known that this upper free end of a valve pin is subjected to rough usage at times, being the only movable member of the valve operating parts exposed when the valve cap is removed. Accordingly, the less subject it is to a binding action in the ledge 37 the less will be the likelihood that it will be bent in the effort to free it when "stuck", such bending acting to impair seriously the efficiency of the valve, as an air-tight seal, if not to destroy it.

As already pointed out, the successful operation of a tire valve of the above described type, is dependent in great degree upon the perfection of the air-tight seal at the seat 53, where the valve is closed, as in Fig. 2, and such tightness, together with its permanence for a period which will provide for long life of the valve, depends upon the accuracy with which the nozzle end 44' is engaged with the elastic gasket 48.

In order to provide solid support of the elastic gasket 48, in such disposition relatively to the valve cup Vx, that there will be no shake at this region, at any time during the life of the valve core, the present invention provides for spinning in against the elastic gasket 48 a construction 49 near the mouth of the cup-like hollow boss 51 in which the elastic gasket 48 is supported, leaving a flaring lip 50 which aids in effecting accurate registry between the mutually contiguous parts of the nozzle 44' and the upper face of the ring 48.

In both structures illustrated, there is thus formed a bead extending inwardly against the elastic gasket firmly fixing such gasket in its position within the cup and confining the rim of the elastic ring or annulus.

I claim:

A tire valve core comprising a body having a longitudinal axial bore and terminating in a tapered nozzle valve element, a valve pin reciprocable in said bore and having secured to the bottom portion thereof a complemental valve element, a spring coiled around said pin and adapted to bias the last mentioned valve element into complemental relation with said tapered nozzle valve element, said complemental valve element being constituted of a retainer member formed with a hollow boss, and an elastic gasket, within said boss, and traversed by said pin, said boss having its vertical wall spun inwardly at a point immediately below it upper edge constituting its lip, so as to form a constriction of the cross-sectional area of the boss, and then outwardly from such point of constriction so as to form a flared opening for said hollow boss, into which flared opening the tapered nozzle valve element is adapted to conveniently enter and become centralized by the guiding of such flared opening in effecting a seating of the end thereof upon the surface of the elastic gasket.

FRANK S. BOROUGHS.